Aug. 31, 1954  V. Z. WILLIAMS  2,688,089
RADIATION INSTRUMENT
Filed June 17, 1952
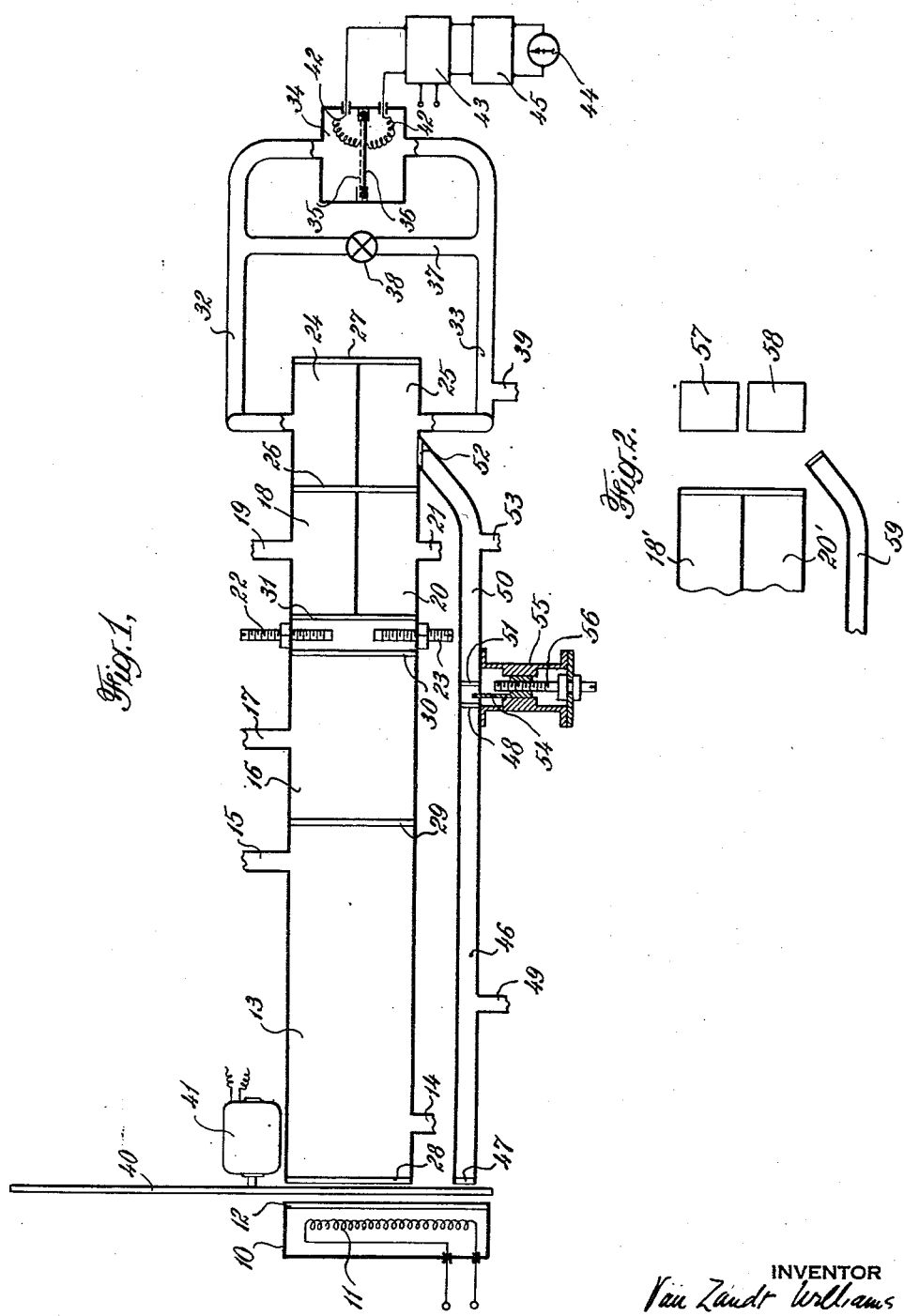
INVENTOR
Van Zandt Williams
BY
Pennie Edmonds Morton Barrows Taylor
ATTORNEYS Patented Aug. 31, 1954

2,688,089

UNITED STATES PATENT OFFICE 2,688,089

RADIATION INSTRUMENT

Van Zandt Williams, Old Greenwich, Conn., assignor to The Perkin-Elmer Corporation, Norwalk, Conn., a corporation of New York Application June 17, 1952, Serial No. 293,989

9 Claims. (Cl. 250—43.5)

This invention relates to radiation instruments, in which a pair of beams of radiation travel along different paths containing media of different absorptivity and fall upon detecting means. Such instruments necessarily operate with unequal transmission of energy along the two paths and the invention is concerned more particularly with the provision in such instruments of means causing the detector to give an initial null signal. Instruments embodying the invention may be employed for a wide variety of purposes and a typical instrument is a gas analyzer of the non-dispersion type, which may be used in accordance with a method forming part of the invention, for determining the amount of a component, referred to hereafter as the "gas of interest," present in a mixture containing one or more other components, which have absorption bands overlapping those of the gas of interest. Instruments of the invention may be employed advantageously in analyses, in which infrared radiation is used, and the application of the invention in a non-dispersion gas analyzer utilizing infrared radiation will, accordingly, be illustrated and described in detail for purposes of explanation.

In my co-pending patent application, Ser. No. 129,603, filed November 26, 1949, of which this application is a continuation-in-part, I have described a non-dispersion gas analyzer, in which infrared radiation from a source travels in the form of two beams along separate paths from a source to a detector. Both beams pass through a cell containing the sample to be analyzed, and a compensator cell, which may contain an inert gas or partial pressures of the interfering components, is interposed in one beam only, while a sensitizer cell containing the gas of interest is interposed in the second beam only. The detector is of the type which includes a pair of chambers employed as two bulbs of a gas thermometer and the pressure differential between the chambers may be measured by means of a thin metal diaphragm employed as one plate of a variable condenser. In the analyzer of the prior application, the detector chambers contain mixtures of the gas of interest and the interfering components and the analyzer may be sensitized, so that the presence of varying amounts of the interfering components in a sample introduced into the sample cell produces equal cooling effects in the detector chambers and the detector responds only to the gas of interest in the sample. The presence of the gas of interest in the sample causes the contents of the chambers to be differentially cooled and the diaphragm to be distorted, the amount of distortion being a measure of the amount of the gas of interest in the sample.

When the analyzer of the prior application and various others of the two beam type are in operating condition and ready for the introduction of the sample into the sample cell, an unbalanced energy condition exists at the detector, so that the detector produces a signal. When such a detector operating at initial unbalance is employed in a feedback circuit, it is necessary to introduce an electrical signal along the feedback path to counterbalance the initial detector signal. A null detector, that is, one producing an initial zero signal, does not require the use of the extraneous signal and is thus ideal for feedback use.

The present invention is directed to the provision of a novel instrument of the two radiation beam type, which inherently requires that it be operated with unequal energies transmitted by the two paths, but which is provided with means for nulling the detector at one operating point. The new instrument, accordingly, has a stable zero and no zero shift will occur, even though the detector and the amplifier gain may change with time. In a form of the new instrument, which includes a recording device producing a chart indication proportional to the amplifier voltage, an electrical gain change will change the chart calibration in terms of sample concentration, but the instrument zero will remain the same.

In the new instrument in the form of a non-dispersion analyzer, the nulling of the detector is accomplished by providing a third beam of radiation, which by-passes the sample cell and falls upon the detector coincidentally with the weaker of the usual two beams. The amount of energy in the third beam is controllable, so that it may supply a quantity of energy sufficient to make up the difference between the first two beams and thus bring the detector to the null condition, and, since the third beam by-passes the sample, the energy transmitted by the third path is constant.

For a better understanding of the invention, reference may be made to the accompanying drawing, in which Fig. 1 is a diagrammatic longitudinal sectional view of one form of the analyzer of the invention; and Fig. 2 is a fragmentary longitudinal sectional view of a modified form of the new analyzer.

The instrument illustrated in Fig. 1 comprises a draft-tight housing 10 containing a source 11 of radiation, the source being any of those commonly employed for producing the kind of radiation to be used in the analysis. In the instrument shown, the source is of a type regularly used for producing infrared radiation. At one side, the housing is closed by a window 12 transmitting radiation emanating from the source, and, beyond the window, there is a sample cell 13 having an inlet 14 for the sample and an outlet 15, so that the sample can be caused to flow through the cell. A filter cell 16 having an inlet 17 lies beyond the sample cell, the two cells being of the same cross-sectional area. A compensator cell 18 having an inlet 19 and a sensitizer cell 20 having an inlet 21 lie side by side beyond the filter cell 16 and the compensator and sensitizer cells each receive part of the radiation, which has passed through the sample and filter cells. A pair of trimmers 22, 23 are mounted adjustably between the filter cell and the compensator and sensitizer cells, respectively, and the trimmers can be moved in and out to vary the amount of radiation entering the compensator and sensitizer cells. Beyond the compensator and sensitizer cells lies the detector made up of chambers 24, 25. The end walls 26, 27 at opposite ends of the detector chambers and the end walls 28, 29, 30, and 31 of the several cells are of a material transmitting the radiation being used.

The detector chambers 24, 25 are connected by respective tubes 32, 33 to a chamber 34 at opposite sides of a partition subdividing the chamber and formed by an electrical condenser consisting of a stationary perforated plate 35 and a distensible imperforate diaphragm 36. Tubes 32, 33 are connected by tube 37 containing a valve 38, which can be opened to equalize the initial pressure in the detector chambers, but normally provides a small leak to maintain pressure equivalence in the chambers under long-term ambient temperature changes in the detector assembly. Tube 33 is provided with an inlet 39 for admission of gas to the detector.

If it is desired to eliminate D. C. ambient temperature effects at the detector, the radiation from the source passing to the sample cell 13 may be interrupted by a light chopper, which may take the form of a semi-circular opaque plate 40 rotated at a low frequency by motor 41. The plates 35, 36 of the condenser are in circuit through leads 42 with the input side of an amplifier 43, which may be a standard electrometer tube amplifier, and, during the operation of the instrument, potential is maintained across the condenser. When the instrument does not include a light chopper, the output of the amplifier may be passed to a standard D. C. meter 44 or a recording device, but, if the instrument includes a light chopper, the output of the amplifier is passed to a rectifier 45 operating in synchronism with the chopper, and the output of the rectifier may then pass to the meter or recording device. The chopper, amplifier, and rectifier may be of the type disclosed in Liston Patent 2,442,298, issued May 25, 1948.

The assembly of cells 13, 16, 18, and 20 provides two paths by which radiation may be transmitted from the source to the detector and the instrument includes means defining a third such path and comprising a cell 46 having transparent windows 47, 48 at opposite ends and an inlet 49. The third path also includes a cell 50 which has a portion aligned with cell 46 and a transparent window 51 close to window 48 but spaced therefrom. The cell 50 is curved to direct radiation into detector chamber 25 and is closed at the end adjacent the chamber by a transparent window 52 which also closes an opening in the wall of chamber 25. Cell 50 is provided with an inlet 53. A trimmer 54 mounted in a guide 55 and operable by an adjustment screw 56 extends into the space between windows 48, 51 and the screw can be adjusted to vary the position of the trimmer and thus vary the amount of radiation passing from the source through the third path into chamber 25.

In the use of the analyzer described in the analysis of a sample containing the gas of interest and one or more interfering components, the instrument is preliminarily sensitized in the following manner. The cells 46, 50 are filled with a gas, which is preferably inert, and the cells are then sealed and the transmission through them cut off by full insertion of trimmer 54. The detector chambers are filled with a gas of interest and an atmosphere of the gas of interest is introduced into the sensitizer cell 20. The compensator cell 18 is then filled with a trial mixture, which consists of an inert gas and the interfering component, when only one such component is present in the sample to be analyzed. If the sample is known to contain more than one interfering component, the compensator cell is filled with a trial mixture of such components. With the instrument thus set up, mixtures containing varying amounts of the interfering component or components are passed through the sample cell, and the responses of the detector are noted. By varying the mixture in the compensator cell and, if necessary, adjusting the trimmers, a condition may be reached, in which the response of the detector is unaffected by variations in the amount of the interfering component or components in the sample. In some cases, it may also be necessary to replace part of the gas of interest in the detector chambers by the interfering component or components in order to arrive at the condition described.

When the instrument has been sensitized, as described, so that the detector will respond only to variations in the gas of interest in the sample, unequal energies will be transmitted by the first two paths to the detector, when the sample cell is empty, and the detector will thus give a zero signal. For reasons set forth above, this is undesirable and, in the new instrument, the detector can be brought to a null condition by backing out the trimmer 54, so as to permit the transmission of energy to the detector by the third path. The radiation so transmitted enters sample cell 25, which receives the weaker of the two beams traveling along the first two paths and the amount of energy transmitted by the third path is such that the total quantity of energy entering chamber 25 along the second and third paths is equal to the amount of energy passing to the detector along the first path. The detector is thus nulled and has no zero signal.

When the instrument is in operating condition with the detector nulled by the third beam, the introduction of the sample into the sample cell 13 and thus into the first two beams results in the detector producing a signal because of the differential cooling in chambers 24, 25. The amplitude of the signal is a measure of the gas of interest present in the sample.

The modified form of the instrument partially shown in Fig. 2 includes a source and a sample cell and a filter cell, which are not shown, but are similar to those shown in Fig. 1. The instrument also includes a compensator cell 18' and a sensitizer cell 20' corresponding to the compensator and sensitizer cells of the Fig. 1 instrument.

The radiation issuing from the compensator and sensitizer cells then falls upon detecting means, including a pair of devices 57, 58 which may be of any of the usual forms, such as, thermocouples, bolometers, photocells, etc, appropriate for the radiation being used in the analysis. The instrument also includes means defining a third path for radiation from the source, such means including a cell 59 having a portion curved to direct the radiation to detector element 58. The instrument also includes trimmers in the three paths.

When the instrument in Fig. 2 has been sensitized, as above described, the first path leading to detector element 57 inherently transmits more energy than the second path leading to detector element 58. The third path including cell 59 then transmits a regulated amount of energy to detector element 58 sufficient to null the detector.

In both forms of instrument shown, the detector includes a chamber or detector element, to which energy is transmitted along a first path, and a separate chamber or detector element, to which energy is transmitted along second and third paths. By appropriate formation of the chopper disk, it is possible to cause energy to be transmitted by the first path intermittently and out of phase with the intermittent transmission of energy by the second and third paths. In this event, the energy transmitted along the paths may enter the same chamber or fall upon the same detector element. The signals produced can be separated in the electronic portion of the analyzer and used in the same manner as in the instrument illustrated.

In the new analyzer, a change in the gas of interest in the sample produces a large change in the compensated beam traveling along the first path and a small change in the sensitized beam traveling along the second path. Since the third beam by-passes the sample cell, the amount of energy transmitted by the third path is constant and does not affect the desirable condition stated. In order that the instrument may operate in the manner described with the third path transmitting a constant amount of energy, it is necessary that this path by-pass the sample cell, but, since there is no variation in the contents of the sensitizer cell during the operation of the instrument, the third beam may pass through this cell on its way to the detector and such an arrangement may be desirable for design convenience. It is essential in all forms of the instrument that the third beam fall upon the detector coincidentally with the weaker of the beams traveling along the first two paths and, when a chopper is employed, the third beam and the weaker of the first two beams must be chopped simultaneously.

In the forms of the new instrument described, the detector signal is stated to be amplified and passed, after rectification, if a chopper is used, to a meter or recording device. It is to be understood, however, that the utility of the invention is not limited to the particular use made of the detector signal or to any particular manner of determining the concentration of the gas of interest in the sample.

I claim:

1. In a gas analyzer, the combination of a source of radiation, detecting means responding to radiation from the source falling thereon, means defining a pair of paths for beams of radiation traveling from the source to the detecting means, said means causing one of said beams to be weaker than the other, and means defining a third path for a beam of radiation traveling from the source to the detecting means to fall thereon coincidentally with the weaker of the first two beams, the total energy in said weaker and third beams producing a response of said detecting means equal to the response produced by the stronger of the first two beams.

2. In a gas analyzer, the combination of a source of radiation, detecting means responding to radiation from the source falling thereon, means defining a pair of paths for beams of radiation traveling from the source to the detecting means, said means causing one of said beams to be weaker than the other, means defining a third path for a beam of radiation traveling from the source to the detecting means to fall thereon coincidentally with the weaker of the first two beams, and means for regulating the third beam to give it an energy value equal to the difference between the amounts of energy in the first and second beams as they fall upon the detecting means.

3. In a gas analyzer, the combination of a source of radiation, detecting means responding to radiation from the source falling thereon, means defining a pair of paths for beams of radiation traveling from the source to the detecting means, said means causing one of said beams to be weaker than the other, means defining a third path for a beam of radiation traveling from the source to the detecting means to fall thereon coincidentally with the weaker of the first two beams, the total energy in said weaker and third beams producing a response of said detecting means equal to the response produced by the stronger of the first two beams, and means for periodically interrupting the three beams, said means interrupting the third beam and said weaker beam in phase.

4. An apparatus for determining the amount of a gas of interest present in a mixture also containing at least one interfering component absorbing a kind of radiation in bands overlapping the absorption bands of the gas of interest, which comprises means for producing a pair of beams of said radiation traveling along separate paths, a cell containing a sample of the mixture to be examined and lying across both paths, a compensator cell lying across the path of the first beam only and containing said interfering component, a sensitizer cell lying across the path of the second beam only and containing the gas of interest, detecting means beyond said compensator and sensitizer cells, said means receiving the radiation traveling along the paths separately and responding thereto, means for causing a third beam of said radiation to fall upon said detecting means coincidentally with radiation traveling along the second path, said third beam by-passing the sample cell, and means for adjusting the amount of energy in the third beam to a value such that the detecting means responds equally to the radiation in the first beam and to the total amount of radiation in the second and third beams.

5. In a method for determining the amount of a gas of interest present in a mixture with at least one interfering component absorbing a specific kind of radiation in bands overlapping absorption bands of the gas of interest, the steps comprising passing said radiation from a source along separate paths to detecting means producing a response to such radiation falling thereon, interposing in one path only a quantity of the interfering component, interposing in the second path only a quantity of the gas of interest, varying the relative amounts of radiation traveling along the two paths, until the response of the detecting means to radiation traveling along the first path is substantially greater in amplitude than the response of the detecting means to radiation traveling along the second path, passing radiation from the source along a third path to fall upon the detecting means coincidentally with radiation traveling along the second path, and varying the amount of radiation traveling along the third path, until the response of the detecting means to radiation traveling along the first path is equal in amplitude to the response of the detecting means to the total amount of radiation traveling along the second and third paths.

6. In a radiation instrument, the combination of detecting means responsive to radiation, means for causing beams of radiation to travel along two different paths and fall upon the detecting means, one beam being weaker than the other, and means for causing a third beam of radiation to travel along a third path different from the first two paths and to fall upon the detecting means coincidentally with the weaker of the first two beams, the total energy in said weaker beam and said third beam producing a response to the detecting means equal to that produced by the stronger of the first two beams.

7. In a radiation instrument, the combination of detecting means responsive to radiation means for causing beams of radiation to travel along two different paths and fall upon the detecting means, one beam being weaker than the other, means for causing a third beam of radiation to travel along a third path different from the first two paths and to fall upon the detecting means coincidentally with the weaker of the first two beams, and means for regulating the intensity of the third beam to give it an energy value equal to the difference between the amounts of energy in the first and second beams as they fall upon the detecting means.

8. In a radiation instrument, the combination of detecting means responsive to radiation, means for causing beams of radiation to travel along two different paths and fall upon the detecting means, one beam being weaker than the other, means for causing a third beam of radiation to travel along a third path different from the first two paths and to fall upon the detecting means coincidentally with the weaker of the first two beams, means for regulating the intensity of the third beam, and means for periodically interrupting the three beams, said means interrupting the third and weaker beams in phase.

9. In a radiation instrument, the combination of detecting means responsive to radiation, means, including a source, for causing beams of radiation to travel along two different paths and fall upon the detecting means, one beam being weaker than the other, and means for directing a third beam of radiation from the source along a path different from the first two paths to fall upon the detecting means coincidentally with the weaker of the first two beams, the total energy in said weaker beam and said third beam producing a response of the detecting means equal to that produced by the stronger of the first two beams.

References Cited in the file of this patent

UNITED STATES PATENTS

| Number | Name | Date |
|---|---|---|
| 2,066,934 | Gulliksen | Jan. 5, 1937 |
| 2,395,489 | Major et al. | Feb. 26, 1946 |
| 2,613,572 | Mathieu | Oct. 14, 1952 |